United States Patent
Kawasaki

(10) Patent No.: US 10,523,825 B2
(45) Date of Patent: Dec. 31, 2019

(54) IMAGE FORMING APPARATUS, IMAGE INSPECTION APPARATUS, AND PROGRAM

(71) Applicant: KONICA MINOLTA, INC., Chiyoda-ku, Tokyo (JP)

(72) Inventor: Tetsu Kawasaki, Hachioji (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 16/270,948

(22) Filed: Feb. 8, 2019

(65) Prior Publication Data

US 2019/0281169 A1 Sep. 12, 2019

(30) Foreign Application Priority Data

Mar. 9, 2018 (JP) ................. 2018-043067

(51) Int. Cl.
*H04N 1/00* (2006.01)

(52) U.S. Cl.
CPC ..... *H04N 1/00005* (2013.01); *H04N 1/00037* (2013.01); *H04N 1/0062* (2013.01); *H04N 1/00076* (2013.01); *H04N 1/00639* (2013.01)

(58) Field of Classification Search
CPC combination set(s) only.
See application file for complete search history.

(56) References Cited

U.S. PATENT DOCUMENTS

| 7,889,367 B2* | 2/2011 | Kawasaki | G06F 3/1213 |
| | | | 358/1.13 |
| 2014/0015189 A1* | 1/2014 | Minamisawa | B65H 29/00 |
| | | | 271/3.18 |

FOREIGN PATENT DOCUMENTS

| JP | 2012223973 A | 11/2012 |
| JP | 2013111871 A | 6/2013 |
| JP | 2013-111871 | * 10/2013 |
| JP | 2016159434 A | 9/2016 |

* cited by examiner

*Primary Examiner* — Ibrahim Siddo
(74) *Attorney, Agent, or Firm* — Buchanan Ingersoll & Rooney PC

(57) ABSTRACT

An image forming apparatus includes: an image former that forms an image on a recording medium; a slip sheet inserter that inserts a slip sheet; and a hardware processor capable of controlling image formation, slip sheet insertion and post-processing, wherein the hardware processor acquires a read image obtained by reading the recording medium on which the image is formed and determines whether an abnormality is present in the image on the recording medium based on the read image, and when detecting the abnormality in the image on the recording medium of a page to which bundle post-processing to bundle recording media as one bundle is applied, the hardware processor performs control to discharge the slip sheet after producing a bundle including the recording medium by the bundle post-processing without inserting the slip sheet.

15 Claims, 8 Drawing Sheets

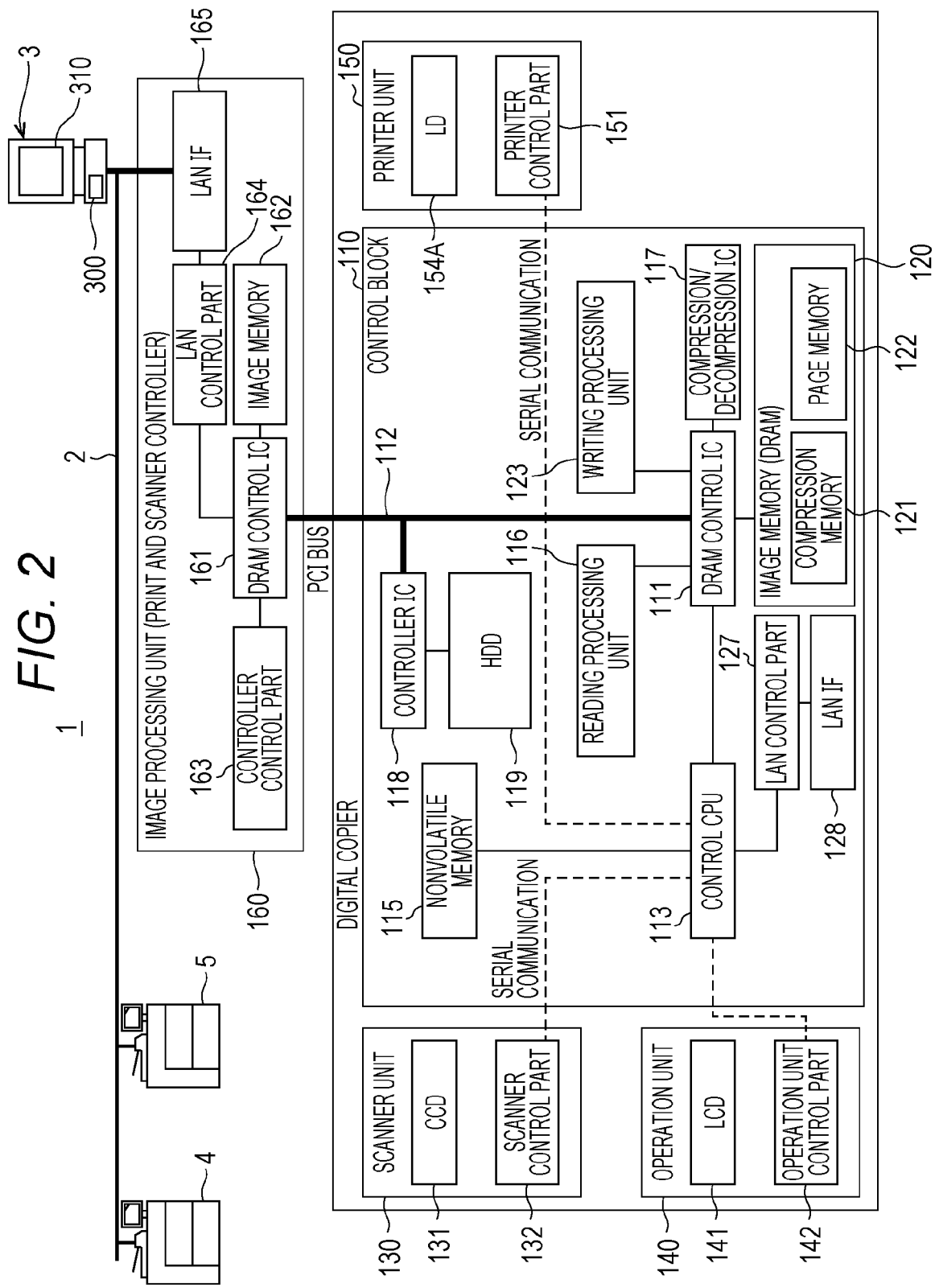

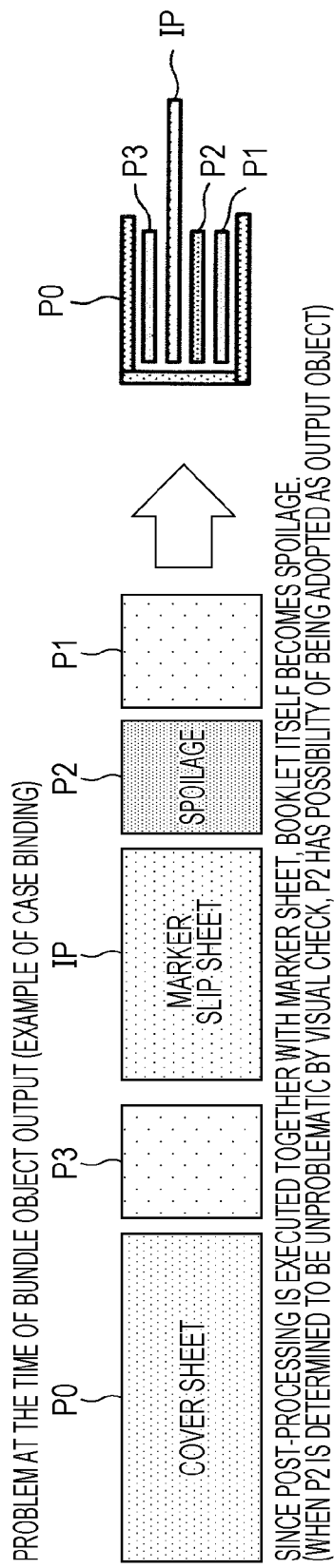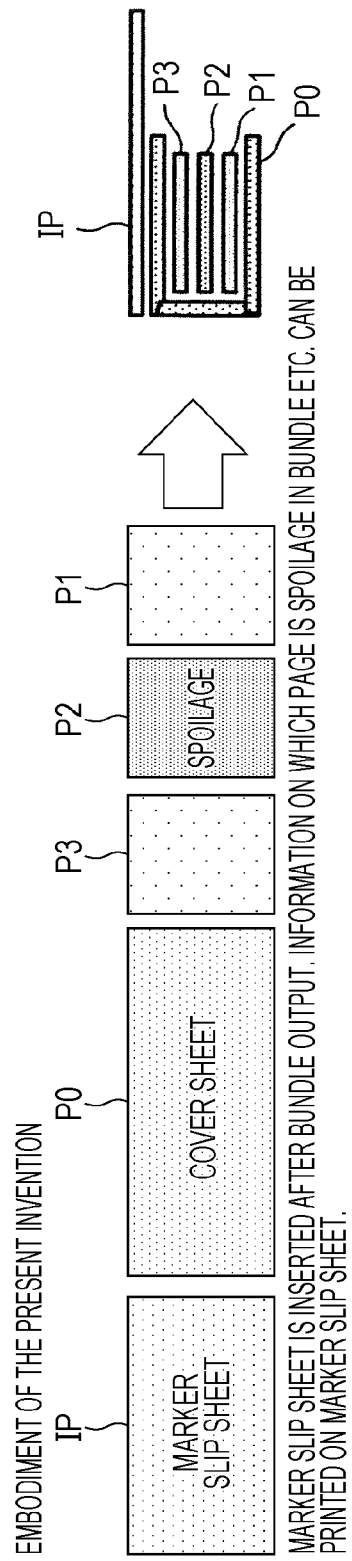

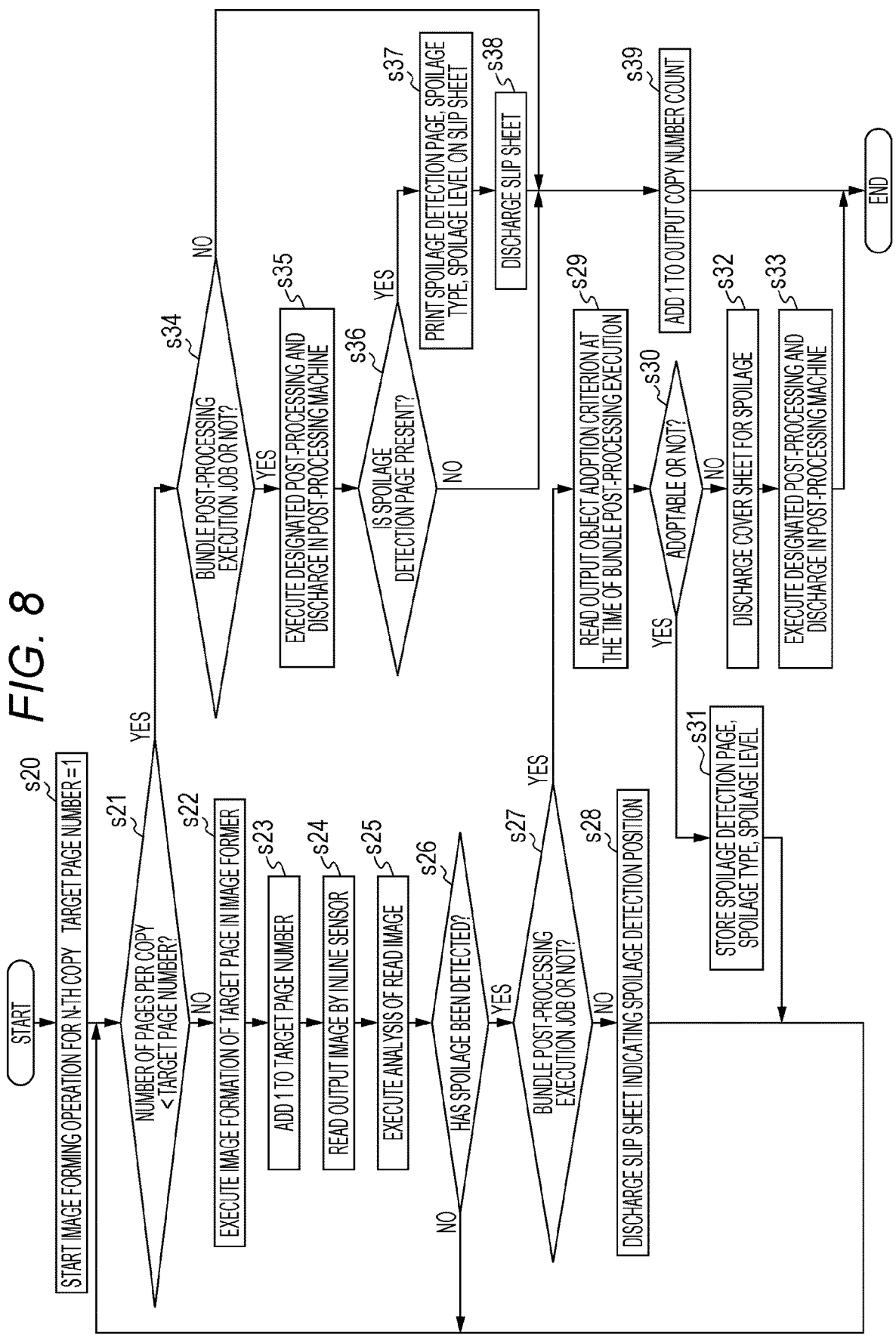

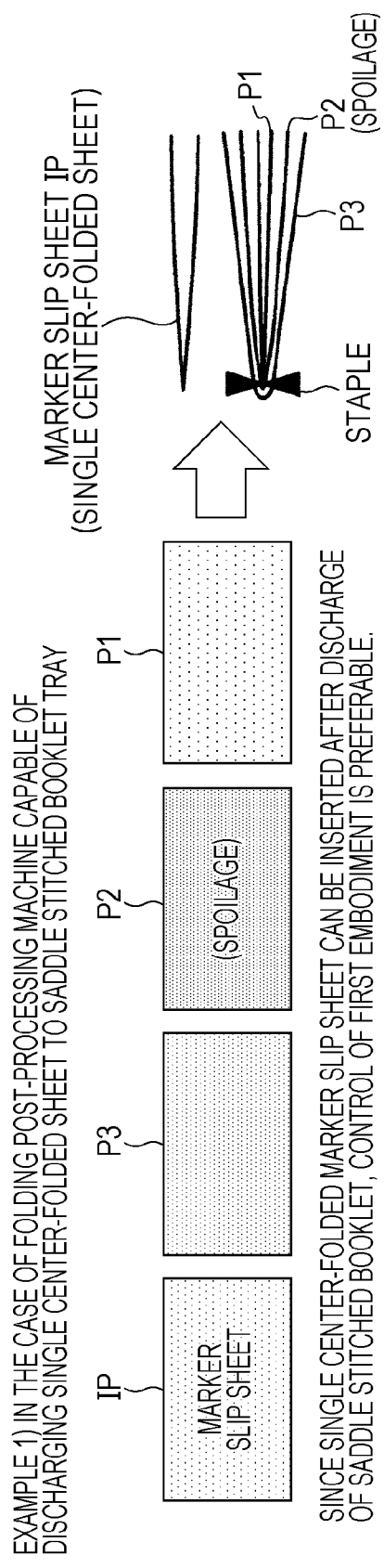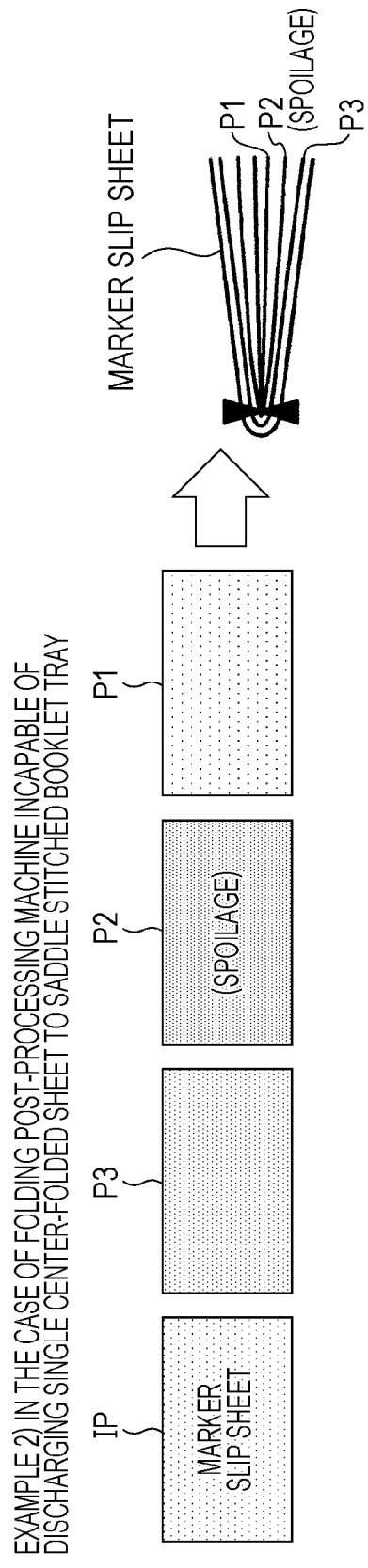

FIG. 11

EXAMPLE 3) IN THE CASE OF POST-PROCESSING MACHINE DISCHARGING COVER SHEET FIRST

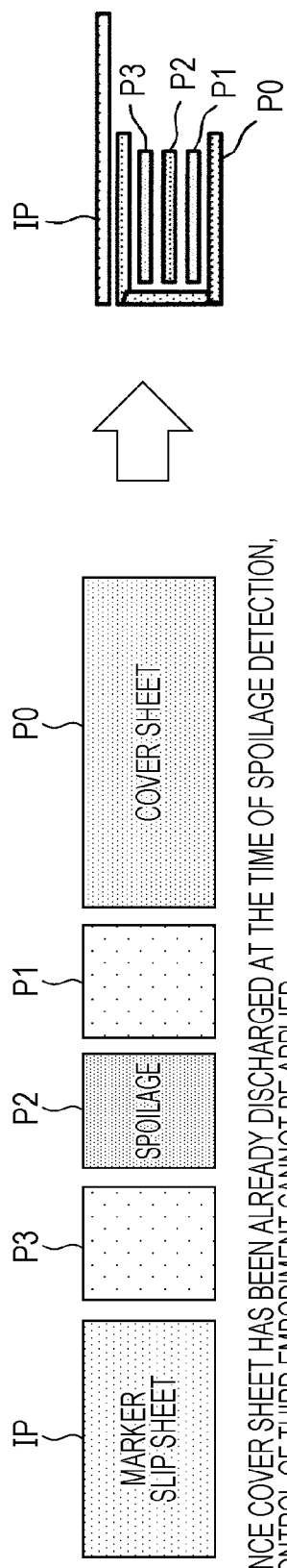

SINCE COVER SHEET HAS BEEN ALREADY DISCHARGED AT THE TIME OF SPOILAGE DETECTION, CONTROL OF THIRD EMBODIMENT CANNOT BE APPLIED. CONTROL OF FIRST EMBODIMENT IS PREFERABLY APPLIED.

FIG. 12

EXAMPLE 4) IN THE CASE OF POST-PROCESSING MACHINE IN WHICH MINIMUM NUMBER OF POST-PROCESSED SHEETS IS DETERMINED TO BE THREE

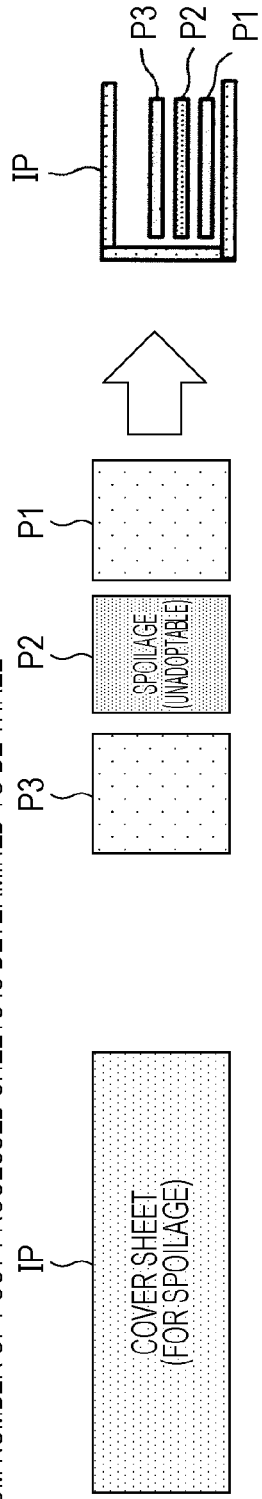

SINCE MINIMUM LIMIT NUMBER (THREE SHEETS) HAS NOT BEEN REACHED AT THE TIME OF SPOILAGE DETECTION, OUTPUT IS CONTINUED. SINCE MINIMUM LIMIT NUMBER HAS BEEN REACHED WHEN P3 IS OUTPUT, COVER SHEET FOR SPOILAGE IS OUTPUT WITHOUT OUTPUT OF SUBSEQUENT PAGES SO THAT POST-PROCESSING/DISCHARGE ARE EXECUTED.

IMAGE FORMING APPARATUS, IMAGE INSPECTION APPARATUS, AND PROGRAM

The entire disclosure of Japanese patent Application No. 2018-043067, filed on Mar. 9, 2018, is incorporated herein by reference in its entirety.

BACKGROUND

Technological Field

The present invention relates to an image forming apparatus, an image inspection apparatus, and a program capable of determining whether there is an abnormality in an image formed on a recording medium.

Description of the Related Art

In the field of image forming apparatuses such as copying machines, printers, and multifunction peripherals, an apparatus having a spoilage automatic detection function is known, which detects an image abnormality (density unevenness, image stain, page misarrangement, etc.) by using image read data obtained by reading an image on a sheet. For example, a read image is compared with a correct image such as image data for printing to determine whether the image coincides with the correct image so that determination of an abnormality such as stain, color shift, or positional deviation is performed, and information on streaks etc. is detected by a failure diagnosis function to diagnose a failure part of the machine. There is also known an apparatus which prints an image for adjustment on an inserted sheet, a trimming margin, etc., and reads the image to adjust the image quality, and even when reading the adjustment image, the apparatus can also determine an abnormality from an unadjustable situation or the like. A case in which there is an abnormality in these operations is referred to as "spoilage", and a sheet having an abnormality is called a spoiled sheet.

When an abnormality is detected, normally the output is suspended. However, productivity is lowered if the machine is stopped and warning is displayed, therefore output is required to be continued even after detection of an abnormality. Therefore, a technique for inserting an interleaving slip sheet for indicating a spoilage detection position and the like and continuing the output operation has been proposed.

For example, JP 2016-159434 A discloses that when an image abnormality such as spoilage, density unevenness, or positional deviation, is detected by reading an output image, if the sheet of the abnormal image has already been discharged, a interleaving slip sheet as a marker for recovery is discharged and the output is continued without suspension.

Also, J P 2013-111871 A discloses a technique in which, when a spoilage of an output image is detected, the sheet on which the spoilage has occurred is discharged to another discharge destination, and instead of the sheet, an interleaving slip sheet indicating the replacement position of the recovery printing sheet is inserted.

According to the techniques of JP 2016-159434 A and JP 2013-111871 A, the user confirms the page in which spoilage has occurred using a slip sheet as a marker, and judges whether the sheet can be adopted as an output object so that recovery can be carried out as needed.

Meanwhile, in the image forming apparatus, bundle post-processing for bundling output objects is sometimes performed such as a bookbinding process, or a stapling process. In the techniques of JP 2016-159434 A and JP 2013-111871 A, when bundle post-processing is being performed, since the post-processing is performed in a state where a slip sheet is inserted, the entire bundle becomes a spoilage.

In response to this, JP 2012-223973 A discloses a technique of inserting a slip sheet for checking later whether stains such as toner scattering due to a jam have occurred at the time of jam occurrence, and discloses that control is performed so as not to insert a slip sheet, or so as to cancel the post-processing mode after inserting a slip sheet to execute outputting in the mode of performing a bookbinding process.

However, according to the technique disclosed in JP 2012-223973 A, when insertion of slip sheets is not performed in a mode in which a bookbinding process is performed, the user cannot grasp the position of the spoilage, and there is a possibility that the spoilage will be overlooked. In addition, in the case of inserting the slip sheet and canceling the post-processing mode, when it is judged that the sheet is adoptable as an output object by the user's inspection, it is necessary to manually perform post-processing, which takes time and labor.

SUMMARY

The present invention has been made in view of the above-described problems, and an object of the present invention is to provide an image forming apparatus, an image inspection apparatus, and a program which enable the user easily to detect the position of a spoilage in apparatuses capable of detecting defects of images and which are capable of continuing operation without lowering productivity.

To achieve the abovementioned object, according to an aspect of the present invention, an image forming apparatus reflecting one aspect of the present invention comprises: an image former that forms an image on a recording medium; a slip sheet inserter that inserts a slip sheet; and a hardware processor capable of controlling image formation, slip sheet insertion and post-processing, wherein the hardware processor acquires a read image obtained by reading the recording medium on which the image is formed and determines whether an abnormality is present in the image on the recording medium based on the read image, and when detecting the abnormality in the image on the recording medium of a page to which bundle post-processing to bundle recording media as one bundle is applied, the hardware processor performs control to discharge the slip sheet after producing a bundle including the recording medium by the bundle post-processing without inserting the slip sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 2 is a control block diagram of the image forming apparatus;

FIG. 3 is a diagram showing a problem at the time of outputting a bundle object in a conventional technique;

FIG. 4 is a diagram showing a method of inserting a marker slip sheet in the image forming apparatus of the present embodiment;

FIG. 8 is a flowchart showing a procedure in a case where a slip sheet insertion method is determined based on whether a spoiled sheet can be adopted as an output object in the image forming apparatus;

FIG. 9 is a diagram showing a slip sheet insertion method in a case where a sheet after single-sheet post-processing can be discharged in the image forming apparatus;

FIG. 10 is a diagram showing a slip sheet insertion method in a case where a sheet after single-sheet post-processing cannot be discharged in the image forming apparatus;

FIG. 11 is a diagram showing a slip sheet insertion method in the image forming apparatus which discharges a cover sheet first; and FIG. 12 is a diagram showing a slip sheet insertion method in a case of using a post-processing apparatus in which the minimum sheet number of post-processing is defined in the image forming apparatus.

DETAILED DESCRIPTION OF EMBODIMENTS

Hereinafter, one or more embodiments of the present invention will be described with reference to the drawings. However, the scope of the invention is not limited to the disclosed embodiments. In the present embodiment, an image inspection apparatus of the present invention is included in the image forming apparatus.

First Embodiment

Figure 1:
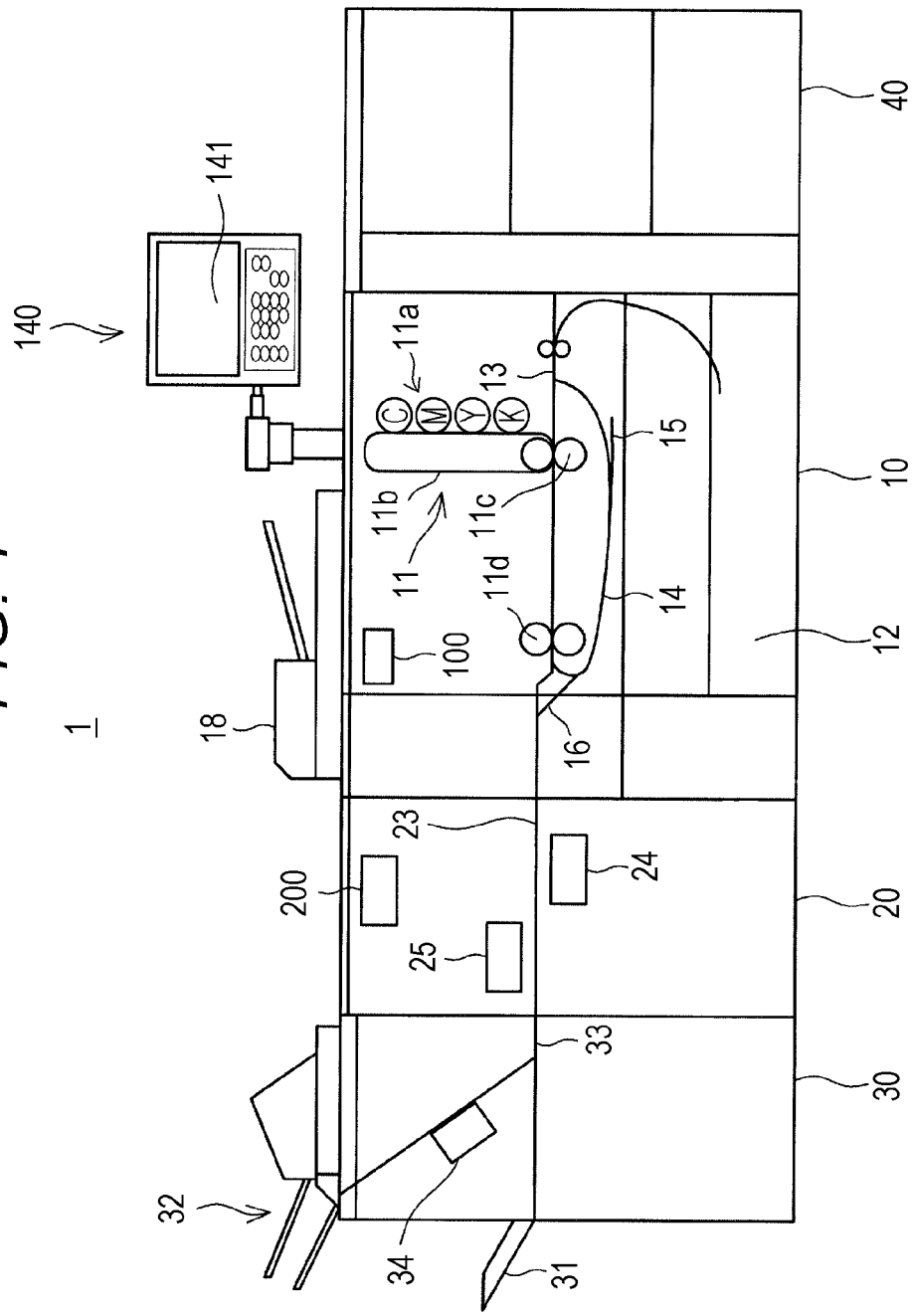
FIG. 1 is a diagram showing an outline of a mechanical configuration of an image forming apparatus according to the present embodiment.

As shown in FIG. 1, an image forming apparatus 1 includes a sheet feeder 40 on the preceding stage side of an apparatus main body 10 and a reading apparatus 20 on the subsequent stage side of the apparatus main body 10. A post-processing apparatus 30 is provided on the subsequent stage side of the reading apparatus 20. Respective apparatuses and the apparatus main body are electrically and mechanically connected, and communication and sheet conveyance are possible between respective apparatuses and the apparatus main body.

The sheet feeder 40 has a plurality of sheet feeding stages, and sheets are stored in each sheet feeding stage. The sheets stored in the sheet feeding stage can be supplied to the apparatus main body 10 installed in the subsequent stage. The sheet corresponds to the recording medium of the present invention. In the present invention, the material of the recording medium is not limited to paper, and may be made of cloth, plastic, or the like.

Sheets for use as interleaving slip sheets are stored in the sheet feeder 40.

In the apparatus main body 10, a main body sheet feeding unit 12 having a plurality of sheet feeding trays is arranged on the lower side in the casing, and sheets are stored in each sheet feeding tray. The sheet corresponds to the recording medium of the present invention. The material of the recording medium is not limited to paper, and may be made of cloth or plastic. Sheets for use as interleaving slip sheets are stored in the sheet feeding tray of the main body sheet feeding unit 12.

A conveyance path 13 is provided in the casing of the apparatus main body 10, and a sheet supplied from the sheet feeder 40 or the main body sheet feeding unit 12 is conveyed downstream along the conveyance path 13.

An image former 11 for forming an image on a sheet is provided near the middle of the conveyance path 13.

The image former 11 has a photoreceptor 11a for each color (cyan, magenta, yellow, black), and around the photoreceptor 11a, a charger, laser diode (LD), developing device, cleaning unit, and the like (not shown) are provided. Further, the image former 11 has an intermediate transfer belt 11b at a position where the belt comes into contact with the photoreceptor 11a for each color. The intermediate transfer belt 11b comes in contact with a sheet on the conveyance path 13 at a secondary transfer portion 11c provided on the way of the intermediate transfer belt 11b. Further, in the conveyance path 13, a fixing device 11d is provided at a position on the downstream side of the secondary transfer portion 11c.

When an image is formed on a sheet, after the photoreceptor 11a is uniformly charged by the charger, the photoreceptor 11a is irradiated with a laser beam from the LD to form a latent image on the photoreceptor. The latent image on the photoreceptor 11a is developed by a developing device to be a toner image, and the toner image on the photoreceptor 11a is transferred to the intermediate transfer belt 11b. The image on the intermediate transfer belt 11b is transferred to the sheet at the secondary transfer portion 11c. After being formed, the image is fixed on the sheet conveyed along the conveyance path 13 by the fixing device 11d.

In the present embodiment, the image former 11 is described as a unit performing image formation with multicolor, but in the present invention, the image former 11 performing image formation in monochrome such as black may be used.

Further, in the conveyance path 13, a reverse conveyance path 14 branches off on the downstream side of the fixing device 11d. In the middle of the reverse conveyance path 14, a downstream conveyance path 16 is branched off and connected to the conveyance path 13 on the downstream side of the branching point of the reverse conveyance path 14. In the reverse conveyance path 14, a retreat conveyance path 15 branches off on the downstream side of the point where the downstream conveyance path 16 branches off. The downstream end side of the reverse conveyance path 14 joins the conveyance path 13 at a position upstream of the image former 11. The conveyance path 13 is connected to a conveyance path 23 of the reading apparatus 20 connected as the subsequent stage in the straight direction.

In the case of forming an image on one side of the sheet, the sheet after the image formation is conveyed straight to the conveyance path 23 of the reading apparatus 20 along the conveyance path 13.

In the case of switching the face side of the sheet after the image formation, the sheet is conveyed to the reverse conveyance path 14, and after having been conveyed beyond the branch point of the downstream conveyance path 16, the sheet is conveyed in the reverse direction in the reverse conveyance path 14, and further conveyed to the downstream side of the conveyance path 13 through the downstream conveyance path 16.

In the case of forming an image on the back side of the sheet by reversing the sheet, the sheet is fed from the conveyance path 13 to the reverse conveyance path 14 and sent to the retreat conveyance path 15, and then further sent to the downstream side of the reverse conveyance path 14 after the leading end and the trailing end of the sheet are switched so as to enter the conveyance path 13. Thereafter, the image former 11 forms an image on the back side of the sheet.

Further, the apparatus main body 10 is provided with an operation unit 140 on the upper part of the casing. The operation unit 140 includes an LCD 141 having a touch panel and a group of operation keys such as a numeric keypad, so that information display and reception of operation input is possible. The operation unit 140 corresponds to the display unit of the present invention and also serves as an operation unit.

In the present embodiment, the operation unit 140 has the operation unit and the display unit which are integrated, but the operation unit and the display unit does not have to be integrated, so that for example, the operation unit may be constituted by a mouse, tablet, terminal or the like. Further, the LCD 141 may be portable.

An automatic document feeder (ADF) 18 is provided at a position where the operation unit 140 is not located in an upper portion of the casing of the apparatus main body 10. The automatic document feeder (ADF) 18 automatically feeds the document set on the document placement table, and the document fed by the automatic document feeder (ADF) 18 is read by a scanner unit 130 shown in FIG. 2.

The document can also be read on a platen glass (not shown).

Further, the scanner unit 130 can also read the printed matter set thereon after output from the image forming apparatus 1. For example, whether there is an abnormality on the sheet set thereon after output from the image forming apparatus 1 can be determined.

Further, the apparatus main body 10 has a control part 100. The control part 100 controls the entire image forming apparatus 1, and is composed of a CPU, a memory, and the like. Note that the control part 100 may be provided outside the apparatus main body. The program executed on the CPU includes the program of the present invention. The control part 100 is a main configuration of the image inspection apparatus of the present invention. Further, when acquiring the reading result of the image, the image inspection apparatus may include a communication unit that communicates with the reading unit, an IO or the like.

The reading apparatus 20 has the conveyance path 23, and the sheet introduced from the apparatus main body 10 is conveyed along the conveyance path 23. The downstream side of the conveyance path 23 is connected to the post-processing apparatus 30 at the subsequent stage.

An image reading unit 24 that reads an image of the lower surface of the sheet conveyed by the conveyance path 23 and an image reading unit 25 that reads an image of the upper surface of the sheet are provided in the conveyance path 23, and the image reading unit 24 is located on the upstream side of the image reading unit 25.

The image reading units 24 and 25 can be constituted by a line sensor composed of a CCD sensor, a CMOS sensor or the like, and can read an image on a sheet conveyed on the conveyance path 23 over the entire length in a direction crossing the conveying direction. The reading results of the image reading units 24 and 25 are transmitted to the control part 100 via a reading control part 200. On the basis of the reading result of the image reading units 24 and 25, the control part 100 can judge the quality of the image on the sheet.

In the present embodiment, though images on the front and back sides of the sheet are read by the two image reading units, a reverse conveyance path may be arranges in the front side to rear side of the image reading unit to perform reverse conveyance of the sheet so that one image reading unit may read images on the front and back sides of the sheet.

Further, in the present embodiment, detection of image defect based on the reading result is performed by the control part 100 provided in the apparatus main body 10, but the determination may be performed by the reading control part 200 provided in the reading apparatus 20. The determination result in the reading control part 200 can be transmitted to the control part 100. In the case where the above determination is performed in the reading apparatus 20, the reading apparatus 20 functions as the inspection device of the present invention. In this case, the reading control part 200 can further function as a slip sheet inserter for inserting slip sheets (to be described later) and an inspection control part for controlling post-processing parts for post-processing of the sheets.

The post-processing apparatus 30 has a conveyance path 33 capable of conveying a sheet, and the conveyance path 33 conveys the sheet introduced from the reading apparatus 20 to the downstream side. In the middle of the conveyance path 33, a post-processing part 34 for executing post-processing to the sheet is provided. The post-processing part 34 can execute predetermined post-processing. For example, in addition to a stapling process and a punching process, post-processing including folding, such as saddle stitching, case binding, inner folded in three, Z-shaped folding, inner folded in four, and quarto can be performed as post-processing. The post-processing part 34 may perform a plurality of types of post-processing. In addition, post-processing for bundling a plurality of sheets as one output object corresponds to the bundle post-processing of the present invention. For example, a folding process performed in a state where a plurality of sheets are stacked, etc. corresponds to the bundle post-processing of the present invention in addition to the saddle stitching, the case binding, and the stapling process. The bundle post-processing of the present invention is not limited to these. Also, the saddle stitching and the case binding process correspond to the bookbinding process of the present invention.

The conveyance path 33 is branched halfway and connected to a first sheet discharge unit 31 and a second sheet discharge unit 32, and a sheet having passed through the post-processing part 34 is discharged to the second sheet discharge unit 32, a sheet not having undergone post-processing is discharged to the first sheet discharge unit 31. It is to be noted that a sheet on which post-processing is not performed may be discharged to the second sheet discharge unit 32.

In the present embodiment, the image forming apparatus 1 is constituted by the sheet feeder 40, the apparatus main body 10, the reading apparatus 20, and the post-processing apparatus 30, but the configuration is not limited to the above in the present invention. For example, the image forming apparatus may be constituted by the apparatus main body 10 and the reading apparatus 20, and the image forming apparatus may be constituted by only the apparatus main body 10, and the reading apparatus 20, the post-processing apparatus 30, the sheet feeder 40 and the like may be provided thereto to form an image forming system.

Further, in the image forming apparatus 1, the image reading units 24 and 25 are provided in the reading apparatus 20 at the subsequent stage of the apparatus main body 10, but the installation place of the image reading unit is not particularly limited, and for example, may be installed in the apparatus main body. Further, the image forming apparatus and the reading apparatus do not need to be mechanically connected. The image inspection apparatus of the present invention may have an image reading unit or does not have to have an image reading unit. Further, the image inspection apparatus may be provided with an image former, or does not have to be provided with an image former. Further, the image inspection apparatus may be provided with an image reading unit.

Next, an electrical configuration of the image forming apparatus 1 will be described with reference to FIG. 2.

The image forming apparatus 1 has a digital copier and an image processing unit (print & scanner controller) 160 as main structures. The digital copier has a control block 110, the scanner unit 130, the operation unit 140, and a printer unit 150. The image processing unit (print & scanner controller) 160 processes image data exchanged with an external apparatus.

The control block 110 has a PCI bus 112, a DRAM control IC 111 is connected to the PCI bus 112, and further a control CPU 113 is connected to the DRAM control IC 111. An HDD 119 is connected to the PCI bus 112 via a controller IC 118.

A nonvolatile memory 115 is connected to the control CPU 113. Programs executed by the control CPU 113, setting data such as machine setting information, and process control parameters are stored in the nonvolatile memory 115 and the HDD 119. The nonvolatile memory 115 and the HDD 119 correspond to the storage units of the present invention.

The nonvolatile memory 115 and the HDD 119 further store a program and parameters for executing a function to determine whether an image on a sheet is acceptable or inacceptable on the basis of the reading result of a sheet and a function to insert a slip sheet at the time of detecting an image abnormality, and in addition store image data of correct image to be used for detection of image abnormality, a threshold value for judging abnormality, a threshold value for judging whether image abnormality makes the output object unacceptable, a minimum limit number of sheets for post-processing, information on whether single-sheet post-processing is possible, on whether the sheet can be discharged to a discharge destination for post-processing without post-processing, and the like. Therefore, the nonvolatile memory 115 and the HDD 119 correspond to storage media. Note that these programs, parameters, and data may be stored in a portable removable recording medium.

The control CPU 113 can grasp the entire state of the image forming apparatus 1 by executing the program and can control the image forming apparatus 1 so as to be able to perform operations such as sheet conveyance, image formation, and post-processing and control such as processing of image data for image formation. In the present embodiment, the control CPU 113 and the programs executed in the control CPU 113 constitute the control part of the present invention. The above program includes the program of the present invention. Note that the program may be stored in the HDD 119 or the like in addition to the nonvolatile memory 115, or may be stored in a portable recording medium.

The control CPU 113 can acquire and analyze the read image data generated by the image reading units 24 and 25 as a reading result and perform image inspection for determining whether there is an abnormality in the image formed on the sheet. The inspection performed by the control CPU 113 can be accomplished by a software processing that causes the CPU to read and to execute an inspection program.

For example, the control CPU 113 compares the read image data with the original image data or the inspected normal image data, and can determine that the image region where the difference exceeds an allowable range is abnormal. Alternatively, the control CPU 113 determines one or a plurality of feature points and their feature amounts of the original image data and the read image data, and can also determine that an image region is abnormal where the feature point determined to be similar is located based on the determined feature amount by a discriminant analysis method. The feature amount is not particularly limited, and examples thereof include a gradient direction histogram, a speed up robust characteristic, a local binary pattern, a Haar wavelet, a color histogram, and the like. Also, the discriminant analysis method is not particularly limited, and a neural network, a support vector machine, and the like can be cited.

The control CPU 113 can also determine the type of abnormality and its level. The types of abnormality include defects such as streaks in images formed on the sheet, creases, image errors, and disappearance, stains such as toner scattering, and color shift.

For example, since the feature amount of the image becomes similar when the type of abnormality is the same, the control CPU 113 can determine similarity between the feature amount of the feature point determined to be abnormal and the feature amount of each type of abnormality, such as streaks and toner scattering acquired in advance so as to determine the type of abnormality.

In addition, since the abnormality is more likely to be visually recognized as the difference of the image data from the normal image data or the area judged to be abnormal is larger, the control CPU 113 can determine the level of abnormality according to these sizes.

Furthermore, when an abnormality of the image is detected, the control CPU 113 can perform control to insert a slip sheet between the abnormal sheet and the next sheet or discharge the slip sheet. The slip sheet is preferably different in color and size from the sheet used in the job, but the same sheet may be used as the sheet used in the job. When a slip sheet is inserted, the position information on the page where the image defect is detected (page number, how many pages before, etc.) and information on the detected image defect (type of image defect, detection level, etc.) can also be printed on the slip sheets. The slip sheet may be stored in the sheet feeder 40 or the main body sheet feeding unit 12 or may be stored in an insertion tray or the like (not shown) housing cover sheets or the like.

Further, the inserting position and the discharging timing of the slip sheet can be changed based on whether the job being output includes bundle post-processing, and based on the type of post-processing, restrictions on post-processing, order of discharging sheets, and the like. Furthermore, when an abnormality of an image is detected, whether the sheet on which an image defect has occurred can be adopted as an output object can be determined on the basis of the type and level of the abnormality, and output suspension, and insertion or discharge of slip sheets can be controlled according to the determination result.

The same processing as described above can be performed also in the case where the reading control part 200 determines whether there is an abnormality in the image. At this time, the program executed by the reading control part 200 corresponds to the program of the present invention.

A scanner control part 132 of the scanner unit 130 is connected to the control CPU 113 so as to enable serial communication.

The scanner unit 130 includes a CCD 131 and the scanner control part 132. The CCD 131 can optically read an image on a sheet. The scanner control part 132 controls the entire scanner unit 130, and controls reading of an image by the CCD 131 and the like. The scanner control part 132 is connected to the control CPU 113 so as to enable serial communication, and is subjected to the control of the control CPU 113. Note that the scanner control part 132 can be constituted by a CPU, a program for operating the CPU, and the like.

The image data read by the CCD 131 is transmitted to a reading processing unit 116 via the DRAM control IC 111, and processing such as predetermined correction is performed in the reading processing unit 116.

The operation unit 140 includes a touch panel type LCD 141 and an operation unit control part 142. On the LCD 141, various information can be displayed and operation input can be performed. The operation input can also be performed by operation keys or the like.

In the operation unit 140, settings and operation commands in the apparatus main body 10, operation control conditions such as job output conditions, presence/absence of post-processing, and detection conditions of image defects can be input. Further, in the operation unit 140, a setting content, machine state, document image, print adjustment screen, and the like can be displayed.

In the operation unit 140, various settings can be made for the apparatus main body 10, reading apparatus 20, post-processing apparatus 30, etc. by operation input through the LCD 141 or operation keys, and the control part controls operations such as the image formation and conveyance of sheets, start of a job output, judgment of spoilage, insertion of a slip sheet, and post processing based on the setting.

The operation unit control part 142 controls the entire operation unit 140. The operation unit control part 142 is connected to the control CPU 113 so as to enable serial communication, and controls the operation unit 140 in response to a command from the control CPU 113. The operation unit control part 142 can be constituted by a CPU, a program for operating the CPU, and the like.

An image memory (DRAM) 120 is connected to the DRAM control IC 111. The image memory (DRAM) 120 is composed of a compression memory 121 and a page memory 122, and can store image data acquired by the scanner unit 130 and image data acquired from the external apparatus via a network 2 as job data, and thus the image memory (DRAM) 120 can store the image data of the job for printing and the read image data read by the image reading units 24 and 25.

The image memory (DRAM) 120 has the compression memory 121 and the page memory 122. Compressed image data is stored in the compression memory 121, and uncompressed page image data for image formation is temporarily stored in the page memory 122.

Image data relating to a plurality of jobs can be stored in the image memory (DRAM) 120 under the control of the above-described DRAM control IC 111. Furthermore, job setting information, image data of a reserved job, and the like can be stored. Note that these data can also be stored in the HDD 119.

A compression/decompression IC 117 is connected to the DRAM control IC 111. The compression/decompression IC 117 can compress the image data and decompress the compressed image data.

A writing processing unit 123 is further connected to the DRAM control IC 111. The writing processing unit 123 performs data processing for use in the image forming operation in an LD 154A.

Further, a printer control part 151 of the printer unit 150 is connected to the control CPU 113. The printer control part 151 includes a CPU, a storage unit, and the like, and receives an instruction from the control CPU 113 to control the entire printer unit 150, so as to control the image forming operation by the LD 154A. The LD 154A is a general name which the LD for each color is collectively referred to as. Further, the printer unit 150 can control the image former 11 and the conveyance unit including the conveyance path 23.

Furthermore, a LAN control part 127 is connected to the control CPU 113, and a LAN interface 128 is connected to the LAN control part 127. The network 2 and other networks can be connected to the LAN interface 128, and data can be exchanged with an external apparatus via the LAN interface 128.

Further, a DRAM control IC 161 of the image processing unit (print & scanner controller) 160 is connected to the PCI bus 112.

In the image processing unit (print & scanner controller) 160, an image memory 162 is connected to the DRAM control IC 161, and a controller control part 163 is connected to the DRAM control IC 161. Further, a LAN control part 164 is connected to the DRAM control IC 161, and a LAN interface 165 is connected to the LAN control part 164. The LAN interface 165 is connected to the network 2.

An external apparatus 3, other image forming apparatuses 4 and 5, and the like are connected to the network 2. The image forming apparatus 1 can exchange data with an external apparatus 3 and other image forming apparatuses via the network 2. In addition to the LAN, the network 2 may be used as a WAN, a telephone line, or the like, and may be wireless or wired.

The external apparatus 3 has an external apparatus control part 300 that controls the entire external apparatus 3. The external apparatus control part 300 can be constituted by a CPU, a program for operating the CPU, a storage unit, and the like. Further, the external apparatus 3 has an external display unit 310 capable of displaying information and an operation unit (not shown) on which desired operation can be input.

The external apparatus control part 300 can also be used as a terminal or an apparatus that manages the image forming apparatus 1. In this case, the external apparatus 3 is connected to the LAN interface 128 via the network 2.

When the image forming apparatus 1 is managed by the external apparatus 3, the external apparatus control part 300 functions as a management control part that manages the image forming apparatus. The external apparatus control part 300 can manage operations such as image formation, a sheet feeding operation, image reading, image inspection, and post-processing.

When managing the image forming apparatus, the external apparatus 3 may directly control the image forming apparatus, or alternatively instructs the image forming apparatus about the control contents so that the control part of the image forming apparatus may execute control according to the instruction contents.

Further, the external apparatus 3 can receive a read image acquired by the image reading units 24 and 25 of the reading apparatus 20 and detect a spoilage based on the read image, and can also control slip sheet insertion or the like at the time of spoilage detection. In this case, the external apparatus 3 can be used as the image inspection apparatus of the present invention, and the external apparatus control part 300 functions as the control part of the present invention, and further the program executed in the external apparatus control part 300 corresponds to the program of the present invention.

Next, the basic operation of the image forming apparatus 1 will be described.

First, a procedure for storing image data in the image forming apparatus 1 will be described.

When the scanner unit 130 reads the image of the document to generate image data, the document is placed on the scanner unit 130, and the image of the document is optically read by the CCD 131. In this case, the scanner control part 132 having received the instruction from the control CPU 113 controls the operation of the CCD 131.

The image read by the CCD 131 is sent to the reading processing unit 116, and the reading processing unit 116 performs predetermined data processing. The processed image data is sent to the compression/decompression IC 117 to be compressed by a predetermined method in the compression/decompression IC 117, and stored in the compression memory 121 or the HDD 119 via the DRAM control IC 111.

The image data stored in the compression memory 121 or the HDD 119 can be managed as a job by the control CPU 113. When image data is managed as a job, printing conditions are stored in association with the image data in the image memory (DRAM) 120 or the HDD 119.

It should be noted that the print image data and the printing conditions may be stored in different storage media as long as they are associated with each other. The printing conditions are set by the user through the operation unit 140, or are automatically set to the initial setting or operation status.

On the other hand, when image data is acquired from the outside, for example, when image data is acquired from the external apparatus 3, other image forming apparatuses 4 and 5, etc. via the network 2, image data is received via the LAN interface 165 of the image processing unit (print & scanner controller) 160. The received image data is stored in the image memory 162 via the LAN interface 165, LAN control part 164, and DRAM control IC 161.

Thereafter, the image data stored in the image memory 162 is temporarily stored in the page memory 122 via the DRAM control IC 161, the PCI bus 112, and the DRAM control IC 111.

In the case where the image data is page description data, the image data can be converted into a raster image by performing the RIP processing of the image data by the controller control part 163.

The print data stored in the page memory 122 is sequentially sent to the compression/decompression IC 117 via the DRAM control IC 111 to be compressed and stored in the compression memory 121 via the DRAM control IC 111. When being stored in the HDD 119, the print data is stored therein via the DRAM control IC 111 and the controller IC 118. These pieces of print data are managed by the control CPU 113 in the same manner as described above. The image memory (DRAM) 120 and the HDD 119 serve as storage units for storing image data.

In the case of outputting an image by the image forming apparatus 1, that is, when the apparatus is used as a copying machine or a printer, image data stored in the compression memory 121, the nonvolatile memory 115, the HDD 119 and the like is transmitted to the compression/decompression IC 117 via the DRAM control IC 111 and the image data is decompressed. The decompressed image data is sent to the writing processing unit 123 via the DRAM control IC 111, and the writing processing unit 123 repeatedly develops the data to the LD 154A according to the set printing conditions, and writing to each photoreceptor is carried out by the LD 154A based on the image data. The image written on the photoreceptor is fixed on the sheet after development, transfer, fixing, and the like.

When the image forming apparatus 1 is used as a copying machine, the control CPU 113 is notified about information such as print conditions (print mode) set on the operation unit 140, and the control CPU 113 creates setting information. The created setting information can be stored in a RAM in the control CPU 113.

When the image forming apparatus 1 is used as a printer, the printing conditions can be set by the printer driver in the external apparatus 3. Similarly to the image, the printing conditions set here are transferred from the external apparatus 3→the LAN IF 165→the image memory 162→the DRAM control IC 161 (controller)→the DRAM control IC 111 (main body)→the page memory 122, and stored in the page memory 122.

Next, a description will be given of a method of inserting and discharging a slip sheet when a spoilage is detected during output of a job that executes bundle post-processing.

Conventionally, in the field of image forming apparatuses, there has been known a technique capable of determining the quality of an image based on a read image obtained by reading an image of an output object and detecting a spoilage. In the case of detecting a spoilage, in order to avoid a decrease in productivity, a technique is used in which the output operation is continued after discharge of a marker slip sheet for indicating the position of the spoilage. Then, after output of the job, it is judged whether the spoiled sheet can be adopted as an output object by visual inspection of the user, and when it is judged that the sheet can be adopted, the output object regarded as a spoiled sheet can be handled as an output object with no abnormality.

However, in the case of performing post-processing in which the outputted sheets are combined as a bundle such as case binding process, or saddle-stitching, if a marker slip sheet is inserted immediately after the spoiled sheet, a bundle of sheets including the spoiled sheet and the marker sheet is generated. In this case, even if the user decides that a spoiled sheet is adoptable as an output object, since the slip sheet is included in the bundle of sheets including this adoptable sheet, the bundle itself becomes a spoilage.

For comparison, a conventional slip sheet insertion method is shown in FIG. 3.

FIG. 3 shows a case where a job for all three pages for case binding is output.

As shown in FIG. 3, according to the conventional technique, when an abnormality is detected on the second page by image inspection, a marker slip sheet IP is inserted next to the second page. Therefore, when case binding is performed using the cover sheet P0, a booklet including a slip sheet is created.

Therefore, even if the user visually inspects the second page which is regarded as spoiled and it is determined that there is no problem, since the slip sheet is included in the booklet itself, the booklet cannot be adopted as an output object.

Therefore, in the present embodiment, when a spoilage is detected during the output of a job that executes bundle post-processing, output is continued to perform bundle post-processing, and the slip sheet is controlled to be discharged after the bundle is discharged.

FIG. 4 is a diagram showing a method of inserting a slip sheet in the present embodiment.

In FIG. 4, as in the example of FIG. 3, a case where a job for all three pages for case binding is output is shown. In the case where image defect is detected on the second page by image inspection and the page is determined to be spoiled, the third page and the cover sheet P0 are output to perform a case binding process instead of inserting the marker slip sheet IP immediately after the second page, and the marker slip sheet IP is discharged after output of the bundle. As shown on the right side of FIG. 4, a marker slip sheet is disposed on the bundled output object at the sheet discharge destination.

In addition, the position of the spoilage and the information on the abnormality can also be printed on the marker slip sheet. For example, which page in the bundle is a spoilage can be printed on the slip sheet.

Figure 5:
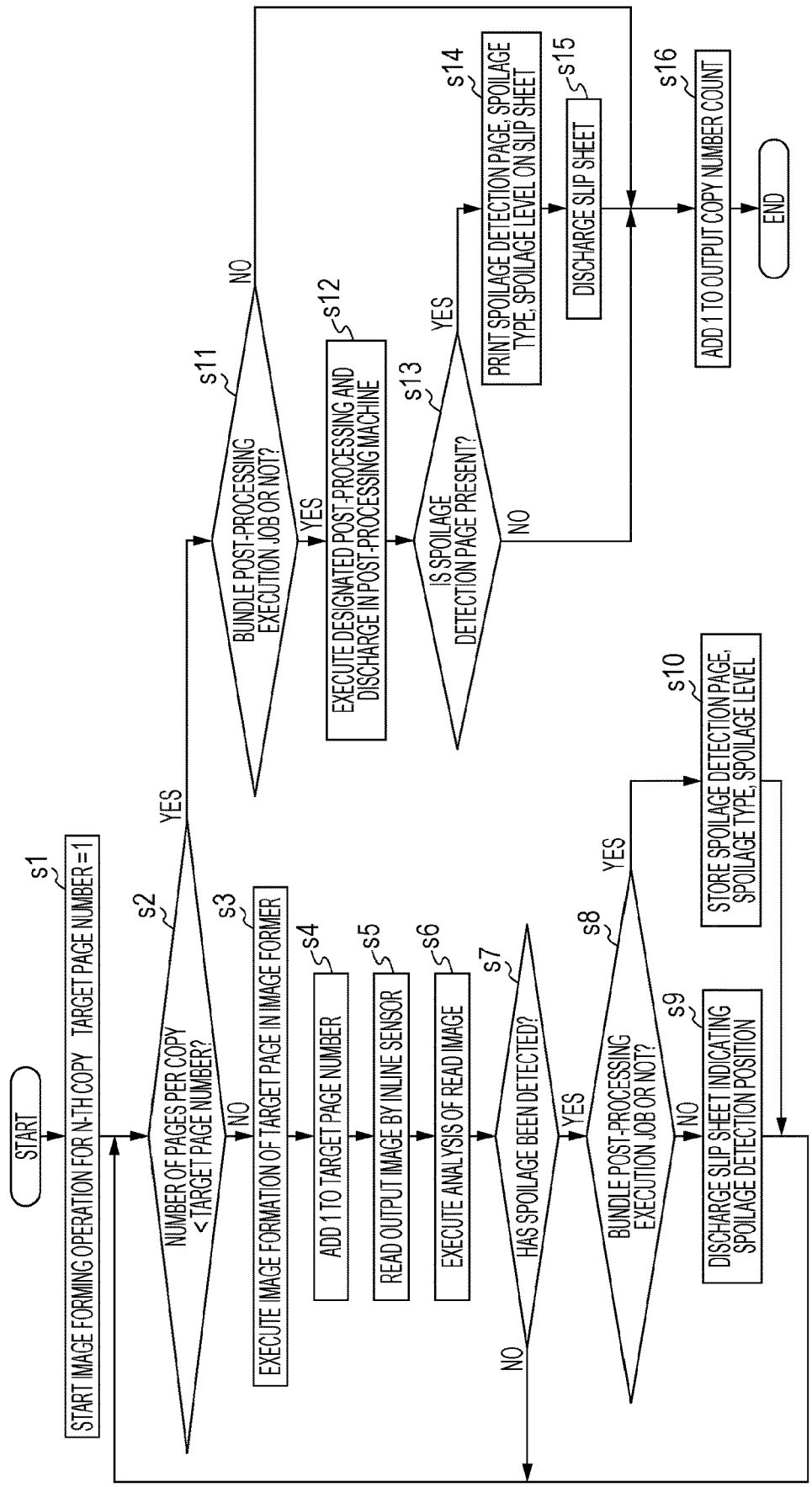
FIG. 5 is a flowchart showing a procedure of inserting a marker slip sheet in the case of outputting a job that executes bundle post-processing in the image forming apparatus.

The discharge procedure of the slip sheet of the present embodiment will be described with reference to the flowchart of FIG. 5. The following operations are executed under the control of the control part of the image forming apparatus 1, the reading control part, the external apparatus control part of the external apparatus 3, or the like.

When the image forming operation of the Nth copy is started, the target page number is set to 1 (step s1), and it is determined whether the target page number is larger than the number of pages per copy (step s2). When the target page number is less than or equal to the number of pages per copy (step s2, No), image formation of the target page is performed in the image former (step s3), and 1 is added to the target page number (step s4). Then, the output image is read by the in-line sensor (image reading unit) (step s5), and the analysis of the read image is executed (step s6). For the analysis of the read image, the read image is compared with previously prepared correct image data and the image may be analyzed based on the comparison result.

As a result of the analysis, it is determined whether spoilage (abnormality) is detected (step s7). When no spoilage is detected (step s7, No), that is, when no image abnormality is detected, the processing returns to step s2 and the target page number is compared with the number of pages per copy again. When a spoilage is detected, that is, when an image abnormality is detected in the read image (step s7, Yes), it is determined whether the page being output is in a bundle post-processing execution job (step s8).

When the page is not in a bundle post-processing execution job (step s8, No), the slip sheet indicating the spoilage detection position is discharged (step s9). Information such as the type of spoilage may also be printed on the slip sheet. After discharging the slip sheet, the processing returns to step s2, and the target page number and the number of pages per copy are compared again. When the job is a bundle post-processing execution job (step s8, Yes), the spoilage detection page, the spoilage type and the spoilage level are stored (step s10). Thereafter, the processing returns to step s2, and the target page number is compared with the number of pages per copy again.

On the other hand, in the comparison between the target page number and the number of pages per copy, if the target page number exceeds the number of pages per copy (step s2, Yes), whether the output job is a bundle post-processing execution job (step s11). When the job is a bundle post-processing execution job (step s11, Yes), designated post-processing and discharge are performed in the post-processing machine (step s12), and whether there is a spoilage detection page is determined (step s13). This determination can be made based on the information on the spoilage detection page stored in step s10. When there is a spoilage detection page (step s13, Yes), a spoilage detection page, a spoilage type and a spoilage level are printed on the slip sheet (step s14), and the slip sheet is discharged (step s15). Thereafter, 1 is added to the output copy number count (step s16), and the procedure is terminated. When there is no spoilage detection page (step s13, No), 1 is added to the output copy number count (step s16), and the procedure is terminated.

When it is determined that the job is not a bundle post-processing execution job in step s11 (step s11, No), 1 is added to the output copy number count without execution of bundle post-processing (step s16), and the procedure is terminated.

According to the above procedure, the slip sheet can be discharged after completion of the bundle, when a spoilage is detected during output of the bundle post-processing execution job.

By doing in this way, the user confirms whether the spoiled page can be adopted as an output object, and if it is judged that the page can be adopted, the entire bundle can be adopted as an output object, so that sheet discard due to occurrence of spoilage can be suppressed to the minimum.

Second Embodiment

Although in the first embodiment, the user confirms the page determined to be spoiled because the image abnormality is detected and judges whether the sheet can be adopted as an output object, the apparatus may determine whether the sheet cannot be adopted as an output object based on the type and level of the abnormality.

When it is determined that the spoiled sheet cannot be adopted as an output object, it is necessary to perform recovery output of the entire bundle, so that if the remaining pages of the same bundle are output, the sheets become wasted sheets. Therefore, without outputting the remaining pages of the bundle, bundle post-processing is performed on the sheets having been output and then a slip sheet indicating that the sheet bundle is spoilage can be inserted. Since bundle post-processing is performed, the case where the sheet cannot be discharged unless bundle post-processing is performed by the apparatus can be dealt with.

Whether the sheet on which the abnormality is detected can be adopted as an output object can be determined based on the threshold value of the type/level of the detected abnormality. The threshold value can be stored in advance in the storage unit and may be changeable by the user. Further, as the threshold value, a threshold value different from that of a job for performing single-sheet processing or a job not including post-processing can also be used.

The type and level of abnormality that cannot be adopted as an output object is not particularly limited in the present invention. For example, when it is determined that an image for a different page is printed on a sheet, it may be determined that the page is a spoilage that cannot be adopted as an output object, and if the degree of difference from the correct image is equal to or larger than a predetermined value, the sheet may be regarded as a spoilage that cannot be adopted.

Figure 6:
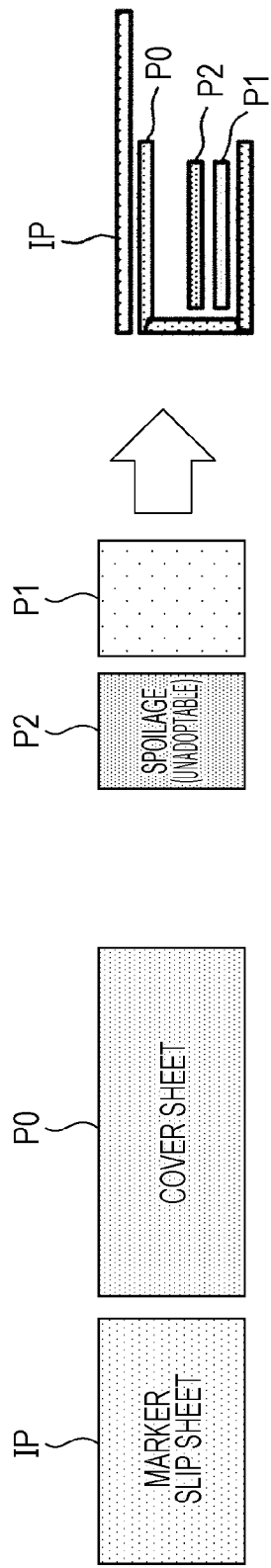
FIG. 6 is a diagram showing a method of inserting a marker slip sheet in a case where a spoiled sheet that cannot be adopted as an output object is detected in the image forming apparatus.

FIG. 6 is a diagram showing an operation example in the case where it is judged that a spoiled sheet cannot be adopted as an output object.

FIG. 6 shows a case where jobs for all three pages for case binding are output. Here, since it is determined that the second page is a spoilage that cannot be adopted as an output object in the image inspection, the cover sheet P0 is fed without output the third page in the same bundle, and bundle post-processing is performed. Then, after the cover sheet, the marker slip sheet IP is fed so that the marker slip sheet IP is placed on the bundled output object. Information on the position and type of spoilage may also be printed on the marker slip sheet.

According to the present embodiment, wasted sheets can be reduced when a spoilage that cannot be adopted as an output object is detected.

Third Embodiment

In the method according to the second embodiment, a cover sheet for case binding are required since a slip sheet is inserted after execution of case binding. However, since a booklet after bookbinding cannot be adopted as an output object, the cover sheet eventually becomes a wasted sheet. In addition, when the user overlooks the slip sheet, there is a possibility that the booklet with a missing page will be adopted as an output object.

In order to solve this problem, the cover sheet is replaced with a sheet for detecting the spoilage (marker slip sheet), and bundle post-processing is performed on the sheet together with the output sheets so that the marker slip sheet becomes a front cover and/or a back cover of the booklet, whereby the user may be notified clearly that the booklet is a spoiled booklet.

Figure 7:
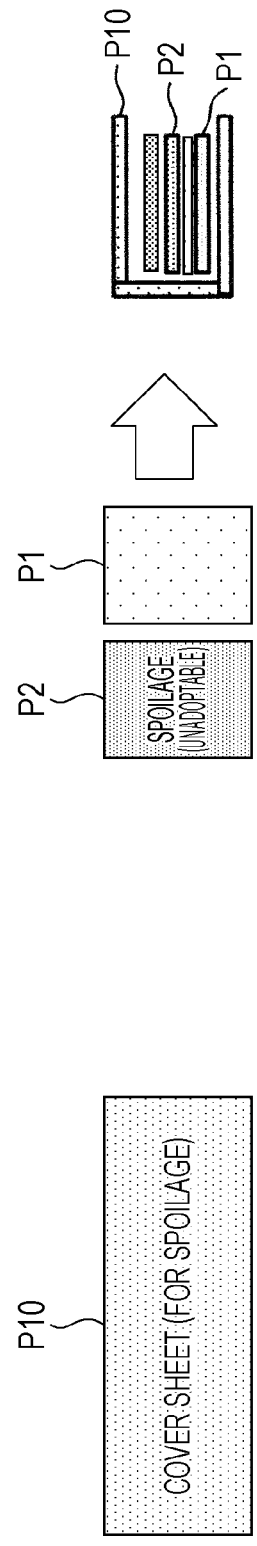
FIG. 7 is a diagram showing a method of inserting a marker slip sheet in a case where a spoiled sheet that cannot be adopted as an output object is detected in the image forming apparatus.

FIG. 7 shows a case where a cover sheet is replaced with a sheet (slip sheet) for a booklet in which a spoilage is detected.

In this example, since it is judged that the second page is spoiled page that cannot be adopted in the image inspection, the output of the third and subsequent pages is cancelled, the cover sheet P10 for the spoilage is fed, and bundle post-processing is executed. As a result, as shown in the right side of FIG. 7, since the booklet having a cover sheet for a spoilage as the front cover sheet and the back cover sheet is discharged, the user can easily recognize that the booklet is a spoiled booklet. Further, there is also an advantage that the cover sheet for bookbinding is not discharged as a wasted sheet.

A procedure of an image forming operation using the slip sheet discharging method of the present embodiment will be described with reference to the flowchart of FIG. 8. The following operations are executed under the control of the control part of the image forming apparatus 1, the reading control part, the external apparatus control part of the external apparatus 3, or the like.

When the image forming operation of the Nth copy is started, the target page number is set to 1 (step s20), and it is determined whether the target page number is larger than the number of pages per copy (step s21). When the target page number is less than or equal to the number of pages per copy (step s21, No), the image former performs image formation of the target page (step s22), and 1 is added to the target page number (step s23). Then, the output image is read by the in-line sensor (image reading unit) (step s24), and the analysis of the read image is executed (step s25).

In the analysis of the read image, comparison may be made with previously prepared correct image data so that the analysis can be performed based on the comparison result.

As a result of the analysis, whether a spoilage is detected is determined (step s26). When no spoilage is detected (step s26, No), that is, when no image abnormality is detected, the processing returns to step s21 and the target page number is compared with the number of pages per copy again. In the case where a spoilage is detected, that is, when an image defect is detected in the read image (step s26, Yes), it is determined whether the outputting job is a bundle post-processing execution job (step s27).

When the job is not a bundle post-processing execution job (step s27, No), a slip sheet indicating the spoilage detection position is discharged (step s28). In addition, the type of spoilage or the like may also be printed on the slip sheet. After discharging the slip sheet, the processing returns to step s21, and the target page number and the number of pages per copy are compared again. When the job is a bundle post-processing execution job (step s27, Yes), the output object adoption criterion (threshold value) at the time of execution of the bundle post-processing is read (step s29), and whether the spoiled sheet can be adopted as an output object is determined based on the read threshold value (step s30). The determination is made based on the type and level of the detected image abnormality. When it is determined that the spoiled sheet can be adopted as an output object (step s30, Yes), the spoilage detection page, the spoilage type, and the spoilage level are stored (step s31). Thereafter, the processing returns to step s21 and the target page number is compared with the number of pages per copy again.

On the other hand, when it is determined that the spoiled sheet cannot be adopted as an output object (step s30, No), the remaining pages are not output and the cover sheet for a spoilage is discharged (step s32), and the designated post-processing and discharge is performed in the post-processing machine (step s33), and the procedure is ended.

On the other hand, in the comparison between the target page number and the number of pages per copy, if the target page number exceeds the number of pages per copy (step s21, Yes), whether the outputted job is a bundle post-processing execution job is determined (step s34). When the job is a bundle post-processing execution job (step s34, Yes), the designated post-processing and discharge are performed in the post-processing machine (step s35), and it is determined whether there is a spoilage detection page (step s36). This determination can be made based on the information on the spoilage detection page stored in step s31. When there is a spoilage detection page (step s36, Yes), a spoilage detection page, spoilage type and spoilage level are printed on the slip sheet (step s37), and the slip sheet is discharged (step s38). Thereafter, 1 is added to the output copy number count (step s39), and the procedure is terminated. When there is no spoilage detection page (step s36, No), the slip sheet is not discharged, and 1 is added to the output copy number count (step s39), and then the procedure is terminated. When it is determined in step s34 that the output job is not a bundle post-processing execution job (step s34, No), 1 is added to the output copy number count (step s39) without execution of bundle post-processing, and the procedure is terminated.

According to the above procedure, the number of wasted sheets can be reduced when a spoiled sheet that cannot be adopted as an output object is detected.

Fourth Embodiment

In the case of applying the control described in the first to third embodiments to an actual image forming apparatus, it is preferable to switch the control to apply any one of the first to third embodiments in view of the type of post-processing (bundling processing or single sheet processing) or the discharge restriction of the post-processing machine (whether single-sheet post-processing is possible, restriction of the minimum limit number of sheets, whether discharge is possible both with and without post-processing execution, the sheet discharge order (1 to N or N to 1), etc.) because of the following reasons.

Whether Bundle Post-Processing or Single-Sheet Processing

As described in the first embodiment, when bundle post-processing is performed as post-processing, it is desirable to discharge the slip sheet after the bundle post-processing.

Whether Discharge after Single-Sheet Post-Processing/without Post Processing is Possible Depending on the post-processing machine, there are restrictions under which only the output objects subjected to bundle post-processing can be discharged to the discharge tray for bundle post-processing, or restrictions under which post-processing for only one sheet (single-sheet post-processing) cannot be performed. When a sheet without post-processing cannot be discharged on the discharge tray for bundle post-processing and single-sheet post-processing cannot be performed, a slip sheet cannot be inserted on the output object after the bundle post-processing. For this reason, when deciding the control at the time of spoilage detection, it is necessary to consider whether single-sheet post-processing can be performed or whether discharge without post-processing can be performed to the discharge tray for bundle post-processing.

FIG. 9 shows a case of using an apparatus capable of a single-sheet post-processing (Example 1), and FIG. 10 shows a case of using an apparatus not capable of single-sheet post-processing (Example 2). It is assumed that saddle stitching is performed as the bundle post-processing.

When single-sheet post-processing is possible, after the saddle stitched booklet has been discharged, a marker slip sheet can be inserted as one center folded sheet, as shown in FIG. 9. Therefore, it is desirable to perform the control according to the first embodiment. Also the control of the second embodiment may be performed.

On the other hand, in the case of using a post-processing apparatus which cannot discharge a single folded sheet after center folding into a saddle-stitched booklet tray, the slip sheet cannot be inserted after the booklet after bundle post-processing, and therefore, as shown in FIG. 10, it is desirable to use the method of the third embodiment, that is, to insert a slip sheet in place of the cover sheet.

Sheet Supply Order of Cover Sheet

In FIGS. 4, 6 and 7 of the first to third embodiments, the apparatus in which the cover sheet is discharged last is shown, but there is also a post-processing apparatus for discharging the cover sheet first. In the case of using a post-processing machine that discharges the cover sheet first, the configuration of the third embodiment, that is, a configuration in which post-processing is performed after feeding of a cover sheet for a spoilage at the time of detecting a spoilage cannot be adopted.

Therefore, it is desirable to determine the insertion method of slip sheets in view of the feeding order of the cover sheets.

The order of feeding the cover sheet is determined by the type of post-processing, the structure of post-processing apparatus, printing setting, and the like. For example, when post-processing of folding is performed, the sheet discharge surface (FaceUP/FaceDown) and the discharge order (1 to N/N to 1) are switched to form a desired output object, in accordance with the structure of the folding unit (mountain fold/valley fold), setting of print surface (inner print/outer print) or the like. Therefore, also in view of these settings, it is desirable to consider whether the cover sheet is discharged first or last.

FIG. 11 shows a case where a post-processing machine that discharges the cover sheet first is used (Example 3).

In the example of FIG. 11, it is determined that the second page is spoiled in image inspection. However, since the cover sheet has already been discharged at the time of detecting a spoilage, the control of inserting a cover sheet for spoilage (slip sheet) at the time of a spoilage detection (third embodiment) cannot be applied. Therefore, it is desirable to insert the marker slip sheet after performing the bundle post-processing by using the control of the first and second embodiments.

Minimum Post-Processing Sheet Number

In the second and the third embodiments, post-processing is performed without outputting of the remaining pages of the bundle at the time of detecting the spoilage. However, in some post-processing machines, there is a minimum limit number of sheets for executing post-processing. In a post-processing machine in which the minimum limit number of sheets is specified, post-processing cannot be executed if the number of output sheets at the time of spoilage detection has not reached the minimum limit sheet number.

Therefore, when the number of outputted sheets at the time of detection of spoilage has not reached the minimum limit sheet number, it is desirable to continue output until the number reaches the minimum limit sheet number (or until all pages have been output), and carry out control so as to perform post-processing/discharge when the limit sheet number has been reached.

FIG. 12 shows a case where a post-processing machine in which the minimum post-processing sheet number is set to 3 is used (Example 4).

In the example of FIG. 12, since the second page is determined to be spoiled in the image inspection, the output of the third page is canceled normally, but since the minimum post-processing sheet number has not been reached at this point, the output is continued. After that, when the third page is output, the minimum limit sheet number is reached, so that the cover sheet for spoilage (slip sheet) is output without output of the subsequent pages and post-processing and discharge are performed.

Whether Post Processing is Bookbinding or Stapling

In the case where the bundle post-processing is bookbinding or stapling, since a sheet cannot be replaced after post-processing, it is desirable to use the control of any one of the first to third embodiments.

On the other hand, when the type of post-processing is not bookbinding or stapling (punching, folding, etc.), a sheet can be replaced in the bundle after post-processing so that a slip sheet may be inserted even in the middle of the bundle.

According to the present embodiment, an appropriate slip sheet discharge method can be selected in view of the contents of the post-processing and restrictions of the post-processing apparatus.

Although embodiments of the present invention have been described and illustrated in detail, the disclosed embodiments are made for purposes of illustration and example only and not limitation. The scope of the present invention should be interpreted by terms of the appended claims

What is claimed is:
1. An image forming apparatus comprising:
an image former that forms an image on a recording medium;
a slip sheet inserter that inserts a slip sheet; and
a hardware processor capable of controlling image formation, slip sheet insertion and post-processing, wherein the hardware processor acquires a read image obtained by reading the recording medium on which the image is formed and determines whether an abnormality is present in the image on the recording medium based on the read image, and when detecting the abnormality in the image on the recording medium of a page to which bundle post-processing to bundle recording media as one bundle is applied, the hardware processor performs control to discharge the slip sheet after producing a bundle including the recording medium by the bundle post-processing without inserting the slip sheet.

2. The image forming apparatus according to claim 1, wherein when detecting the abnormality in the image on the recording medium of the page to which the bundle post-processing to bundle the recording media as one bundle is applied, the hardware processor performs control to discharge the slip sheet after producing the bundle including the recording medium by the bundle post-processing when the recording medium on which the abnormality is detected can be adopted as an output object.

3. The image forming apparatus according to claim 2, wherein when detecting the abnormality in the image on the recording medium of the page to which the bundle post-processing to bundle the recording media as one bundle is applied, the hardware processor cancels output of remaining pages of the bundle and discharges the slip sheet when the recording medium on which the abnormality is detected cannot be adopted as an output object.

4. The image forming apparatus according to claim 3, wherein when detecting the abnormality in the image on the recording medium of the page to which the bundle post-processing to bundle the recording media as one bundle is applied, the hardware processor cancels output of the remaining pages of the bundle, performs bundle post-processing on output recording media, and then discharges the slip sheet when the recording medium on which the abnormality is detected cannot be adopted as an output object.

5. The image forming apparatus according to claim 3, wherein when detecting the abnormality in the image on the recording medium of the page to which the bundle post-processing to bundle the recording media as one bundle is applied, the hardware processor cancels output of the remaining pages of the bundle and inserts the slip sheet to produce output recording medium and the slip sheet as the same bundle when the recording medium on which the abnormality is detected cannot be adopted as an output product.

6. The image forming apparatus according to claim 5, wherein the slip sheet becomes at least one of a front cover and a back cover of the bundle.

7. The image forming apparatus according to claim 1, wherein when detecting the abnormality in the image on the recording medium, the hardware processor determines whether the recording medium on which the abnormality is detected can be adopted as an output object based on at least one of a type and a threshold value of a level of the abnormality in the image.

8. The image forming apparatus according to claim 7, wherein the threshold value is different from a threshold value for determining whether a recording medium on which the abnormality is detected during a single-sheet process can be adopted as an output object.

9. The image forming apparatus according to claim 3, wherein when the recording medium on which the abnormality is detected cannot be adopted as an output object, the hardware processor cancels the output of the bundle after continuing output of the bundle at least until a number of output recording media reaches a minimum limit number when the minimum limit number is stipulated for the bundle post-processing.

10. The image forming apparatus according to claim 1, wherein the hardware processor switches a discharging or inserting method of the slip sheet based on at least one of whether single-sheet post-processing can be executed as the bundle post-processing, whether a minimum limit number has been stipulated for the bundle post-processing, whether discharge can be performed both with and without post processing, and setting of a sheet discharge order.

11. The image forming apparatus according to claim 1, wherein when the bundle post-processing is not a bookbinding process or a stapling process, the hardware processor inserts the slip sheet even between recording media of the bundle when detecting the abnormality in the image on the recording medium of the page to which the bundle post processing to bundle the recording media as one bundle is applied.

12. The image forming apparatus according to claim 1, wherein when inserting or discharging the slip sheet, the hardware processor prints at least one of information on a position of the recording medium on which the abnormality is detected and information on a content of the abnormality on the slip sheet.

13. An image inspection apparatus comprising:
a slip sheet inserter that inserts a slip sheet; and
an inspection control part that can control a post-processing part that performs post-processing on a recording medium, acquires a read image obtained by reading the recording medium on which an image is formed, and determines whether an abnormality is present in the image on the recording medium based on the read image,
wherein the inspection control part can control the post-processing part that performs post-processing on the recording medium, and
when detecting the abnormality in the image on the recording medium of a page to which bundle post-processing to bundle recording media as one bundle is applied, the inspection control part performs control to discharge the slip sheet after producing a bundle including the recording medium by the bundle post-processing without inserting the slip sheet.

14. The image inspection apparatus according to claim 13, wherein when detecting the abnormality in the image on the recording medium of the page to which the bundle post-processing to bundle the recording media as one bundle is applied, the inspection control part performs control to discharge the slip sheet after producing the bundle including the recording medium by the bundle post-processing when the recording medium on which the abnormality is detected can be adopted as an output object.

15. A non-transitory recording medium storing a computer readable program that can execute in a hardware processor capable of controlling image formation, slip sheet insertion and post-processing, and causing the hardware processor to perform:
acquiring a read image obtained by reading a recording medium on which an image is formed;
determining whether an abnormality is present in the image on the recording medium based on the read image; and
performing control to discharge a slip sheet after producing a bundle including the recording medium by the bundle post-processing without inserting the slip sheet when detecting the abnormality in the image on the recording medium of a page to which bundle post-processing to bundle recording media as one bundle is applied.

* * * * *